United States Patent
Arnaud et al.

(10) Patent No.: US 10,025,004 B2
(45) Date of Patent: Jul. 17, 2018

(54) TERMINAL FOR DETECTING AN OPTICALLY INVISIBLE NETWORK, INSTALLATION COMPRISING SUCH A DETECTION TERMINAL, AND METHOD FOR DETECTING AN OPTICALLY INVISIBLE NETWORK

(71) Applicant: SOCIETE PLYMOUTH FRANCAISE, Feyzin (FR)

(72) Inventors: Daniel Arnaud, Saint Etienne (FR); Mounir Saad, Strasbourg (FR)

(73) Assignee: SOCIETE PLYMOUTH FRANCAISE, Feyzin (FR)

( * ) Notice: Subject to any disclaimer, the term of this patent is extended or adjusted under 35 U.S.C. 154(b) by 18 days.

(21) Appl. No.: 14/890,378

(22) PCT Filed: Apr. 30, 2014

(86) PCT No.: PCT/FR2014/051036
§ 371 (c)(1),
(2) Date: Nov. 10, 2015

(87) PCT Pub. No.: WO2014/188100
PCT Pub. Date: Nov. 27, 2014

(65) Prior Publication Data
US 2016/0103243 A1    Apr. 14, 2016

(30) Foreign Application Priority Data

May 22, 2013   (FR) ..................................... 13 54560

(51) Int. Cl.
*G01V 15/00*     (2006.01)
*G01V 3/08*      (2006.01)
(Continued)

(52) U.S. Cl.
CPC ................ *G01V 15/00* (2013.01); *G01V 3/02* (2013.01); *G01V 3/08* (2013.01); *H01R 13/447* (2013.01); *H01R 13/701* (2013.01)

(58) Field of Classification Search
CPC .. H02G 9/00; H02G 9/02; H02G 9/10; H02G 13/40; H02G 15/06; F16L 1/11;
(Continued)

(56) References Cited

U.S. PATENT DOCUMENTS 3,055,970 A * 9/1962 Handley ................. C23F 13/04
                                                      138/177
3,676,567 A * 7/1972 Zinn ....................... C23F 13/04
                                                      174/37

(Continued)

FOREIGN PATENT DOCUMENTS

DE         2735344 A1    2/1979
DE     102010041936 A1    4/2012
(Continued)

OTHER PUBLICATIONS

International Search Report dated Aug. 19, 2014 re: Application No. PCT/FR2014/051036; citing: DE 27 35 344 A1, DE 10 2010 041936 A1 and US 3 781 495 A.

*Primary Examiner* — Tung X Nguyen
*Assistant Examiner* — Lee Rodak
(74) *Attorney, Agent, or Firm* — Cantor Colburn LLP

(57) ABSTRACT

This detection terminal includes a fastening element intended to be fastened in or on a support, an electrical connection component for the connection of the propagation component arranged to propagate an electrical signal along an optically invisible network, and a protection element having at least one electrically conductive portion. The protection element is movable relative to the fastening element between a first position wherein the protection element covers at least partially the electrical connection (Continued)

component and the electrically conductive component is in electrical contact with the electrical conductive portion and is electrically connected to the grounding component through the electrically conductive portion. In a second position, the electrically conductive component is electrically insulated from the electrical connection conductive portion and from the grounding component.

14 Claims, 6 Drawing Sheets

(51) Int. Cl.
    *G01V 3/02*     (2006.01)
    *H01R 13/447*     (2006.01)
    *H01R 13/70*     (2006.01)

(58) Field of Classification Search
    CPC ....... F16L 2201/60; G01V 15/00; G01V 3/02; G01V 3/08; G01V 3/06; H01R 13/447; H01R 13/701; H01R 2101/00; H01R 4/643; H01R 9/2475; H01R 13/447; H01R 13/5213; H01R 13/5216; H01R 13/648; H01R 13/7036; H01R 13/707; H01R 13/717; H01R 13/7175; H01R 11/12; H01R 2103/00; H01R 24/22; H01R 25/006; H01R 31/06; H01R 35/04; H01R 4/36; H01R 4/64; H01R 4/66
    USPC .. 439/92, 93, 95, 96, 97, 99, 100, 101, 103, 439/104, 105, 108
    See application file for complete search history.

(56) References Cited

U.S. PATENT DOCUMENTS

| | | | | |
|---|---|---|---|---|
| 3,781,495 | A | 12/1973 | Splingaerd | |
| 4,346,254 | A * | 8/1982 | Borin | H02G 9/10 174/37 |
| 4,449,098 | A * | 5/1984 | Nakamura | H01B 1/20 138/104 |
| 5,644,237 | A * | 7/1997 | Eslambolchi | G01V 3/02 324/326 |
| 6,218,840 | B1 * | 4/2001 | Warren | H02G 9/00 174/37 |
| 6,825,412 | B1 * | 11/2004 | Tanner | H02G 9/00 174/37 |
| 7,287,990 | B1 * | 10/2007 | Collier | H01R 13/648 439/98 |
| 2002/0112945 | A1 | 8/2002 | Lawson et al. | |
| 2005/0167138 | A1 * | 8/2005 | McCarthy | A47B 21/06 174/53 |
| 2009/0236918 | A1 | 9/2009 | Drane et al. | |
| 2010/0077954 | A1 * | 4/2010 | Eigel | F16L 1/11 116/209 |

FOREIGN PATENT DOCUMENTS

| | | |
|---|---|---|
| FR | 2812727 A1 | 2/2002 |
| WO | 2011147994 A2 | 12/2011 |

* cited by examiner

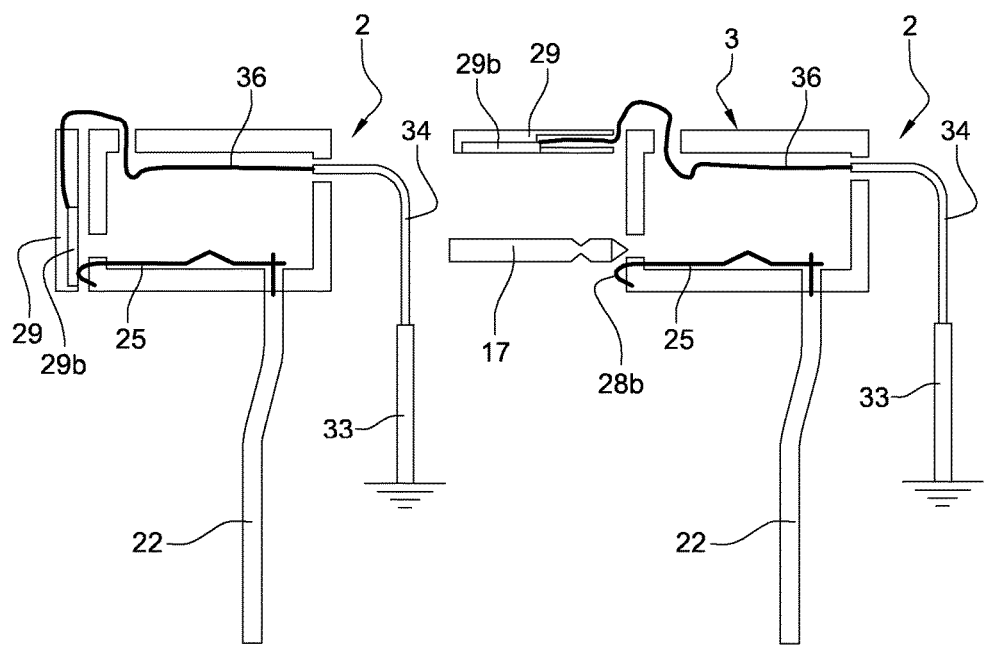

TERMINAL FOR DETECTING AN OPTICALLY INVISIBLE NETWORK, INSTALLATION COMPRISING SUCH A DETECTION TERMINAL, AND METHOD FOR DETECTING AN OPTICALLY INVISIBLE NETWORK

FIELD

The present disclosure concerns a terminal for detecting an optically invisible network, such as a gas, electricity or water network, an installation comprising such detection terminal, and a method for detecting an optically invisible network using such detection terminal.

BACKGROUND

It is important, for saving time and costs, but also for safety, to be able to detect the presence of an optically invisible network and to locate it accurately, without digging the ground or destroying structures, on the occasion of subsequent works.

Several methods can be used to carry out the detection of optically invisible networks.

The detection by electromagnetic means is the most commonly used method. This electromagnetic detection can be performed using electromagnetic detectors relying on the active detection of an electromagnetic signal.

A conventional active detection method consists of injecting, using a current generator, an electrical signal into an electrically conductive tracer wire associated with the network to be identified and disposed along the line route of the latter, and this via connection casings installed at regular distances along the network to serve as access points, and of using an electromagnetic detector arranged to detect an electromagnetic field created by an alternating current circulating in the electrically conductive tracer wire.

The document EP 1 305 546 discloses a connection casing including particularly means for introducing and guiding a plug of an electrical signal generator, a first conductive part intended to be connected to the ground, and a second conductive part intended to be electrically connected to an electrically conductive tracer wire associated with the network to be identified, the first and second conductive parts bearing against each other when no action is exerted on the latter, and the introduction and guiding means being shaped such that, when said plug is engaged in the introduction and guiding means, said plug is able, on one hand to bear against the second conductive part connected to the tracer wire in which the electrical signal must be injected, and on the other hand to separate the first and second conductive parts from each other.

When a significant number of distinct optically invisible networks equipped with connection casings as described in the document EP 1 305 546 are located near each other, the detection of a particular optically invisible network proves to be complex.

Indeed, part of the electrical signal injected into the connection casing associated with the optically invisible network to be detected, is likely to propagate, through the ground, in connection casings associated with other optically invisible networks. Such propagation may involve the creation of an electromagnetic field along the tracer wires associated with other optically invisible networks, such electromagnetic field being likely to disturb the detection and tracking of the optically invisible network to be detected.

A solution to overcome this drawback may consist of inserting separation members into the introduction and guiding means belonging to the connection casings associated with the other networks in order to separate the first and second conductive parts of theses connection casings. These dispositions allow to insulate from the ground the tracer wires associated with networks located near the network to be detected, and then to avoid creating an electromagnetic field along these propagation means likely to disturb the detection of the network to be detected.

However, the insertion of separation members within the connection casings proves to be long and tedious, and this, even more when the connection casings are disposed in technical galleries or wall boxes.

Furthermore, such solution requires to dispose and to store a significant number of separation members.

Accordingly, the detection of a network using a connection casing as described in the document EP 1 305 546 proves to be long, difficult and costly.

The present disclosure aims to remedy these drawbacks.

The technical problem underlying the disclosure relates to providing a detection terminal whose structure is simple and economic, and which allows an easy, fast and reliable detection of an optically invisible network, such as a gas, electricity, optic fibers or water (rainwater, wastewater, drinking water) network.

SUMMARY

To this end, the present disclosure concerns a detection terminal for detecting an optically invisible network, such as a buried pipeline or buried cable, including:
 a fastening element intended to be fastened in or on a support,
 electrical connection means for the connection of propagation means arranged to propagate an electrical signal along the optically invisible network, the electrical connection means including a connection point intended for the electrical connection of an electrical signal source, such as an electrical signal generator, and
 a protection element comprising at least one electrically conductive portion, the protection element being movable relative to the fastening element between a first position wherein the protection element covers at least partially the electrical connection means and the electrically conductive portion is in electrical contact with the electrical connection means and is electrically connected to the grounding means, and a second position wherein the electrically conductive portion is electrically insulated from the electrical connection means.

The structure of the detection terminal according to the disclosure allows easily insulating from the ground the propagation means connected to the electrical connection means belonging to said detection terminal, and this simply by moving the corresponding protection element in its second position.

Accordingly, when a significant number of distinct optically invisible networks equipped with detection terminals according to the disclosure are located near each other, the detection of a particular optically invisible network can be easily and reliably carried out only by moving, in its second position, the protection elements belonging to the detection terminals associated with the other networks. These dispositions allow avoiding the creation of an electromagnetic field along these propagation means likely to disturb the detection of the network to be detected.

It results in an easy and quick localization of the optically invisible network to be detected by connecting an electrical signal source to the connection point and by using an electromagnetic detector arranged to detect the electromagnetic field created by the alternating current circulating in the propagation means.

Furthermore, the presence of the protection element allows protecting the electrical connection means, and making them inaccessible to the public, thereby avoiding any risk of damage of these electrical connection means. These dispositions thus allow ensuring an optimal reliability of detection of the associated optically invisible network.

The structure of the detection terminal according to the disclosure allows also creating an injection point of an electrical signal which is located in the immediate vicinity of the gas meter or electric meter boxes and electrical cabinets of the gas and electricity networks, while being outside these devices, which allows improving the safety of detection of the optically invisible network.

By support it is meant particularly a pavement, a roadway, a wall, an access hatch to a technical gallery, a manhole cover, a manhole or even a wall box.

According to one embodiment of the disclosure, the protection element is arranged to be accessible to the public when the fastening element is fastened in or on the support.

According to one embodiment of the disclosure, the protection element is arranged to be accessible from outside the support when the fastening element is fastened in or on the support. Thus, the detection terminal according to the disclosure does not require intrusion into a closed room or environment, and thus obtaining any prior authorization from the owner of the network to be detected. It results in an easy and quick localization of the optically invisible network associated to the propagation means.

According to one embodiment of the disclosure, the connection point is arranged to be accessible from outside the support when the fastening element is fastened in or on the support and the protection element is in its second position.

According to one embodiment of the disclosure, the protection element is shaped so as to prevent access to the connection point when it is located in its first position, and to release access to the connection point when it is located in its second position.

Advantageously, in its first position, the protection element covers at least partially the fastening element, and preferably at least the central portion of the fastening element.

According to one embodiment of the disclosure, the protection element is intended to be flush with or to protrude from the outer surface of the support when the fastening element is fastened in or on the support and the protection element is in its first position.

According to one characteristic of the disclosure, the fastening element is electrically conductive and forms at least partially the grounding means, the electrically conductive portion of the protection element being connected to the fastening element so as to maintain electrical continuity between the fastening element and the electrical connection means when the protection element is in its first position.

According to one embodiment of the disclosure, the protection element is movably mounted on the fastening element between its first and second positions.

According to one characteristic of the disclosure, the protection element is captively mounted on the fastening element.

According to one characteristic of the disclosure, the protection element is removably mounted on the fastening element.

According to one characteristic of the disclosure, the detection terminal comprises a connection casing in which are housed at least partially the electrical connection means.

According to one characteristic of the disclosure, the connection point is disposed in the connection casing.

According to one embodiment of the disclosure, the connection casing is made of an electrically insulating material.

According to one embodiment of the disclosure, the connection casing is mounted on the fastening element.

Advantageously, the fastening element comprises a housing in which are housed at least partially the connection casing.

According to one embodiment of the disclosure, the protection element is shaped so as to cover, in its first position, at least partially the connection casing.

According to one characteristic of the disclosure, the detection terminal comprises means for introducing and guiding a plug of an electrical signal generator, the introduction and guide means being shaped such that, when said plug is engaged in the introduction and guide means, said plug is able to come in electrical contact with the connection point.

According a characteristic of the disclosure, the introduction and guide means are arranged on the connection casing.

According to one characteristic of the disclosure, the detection terminal comprises a closing cap movable between a closed position wherein the closing cap prevents access to the introduction and guide means, and a released position wherein the closing cap releases access to the introduction and guide means.

According to one embodiment of the disclosure, the closing cap is pivotally mounted between its closed and released positions.

According to one embodiment of the disclosure, the protection element is shaped so as to cover, in its first position, at least partially the closing cap.

According to one embodiment of the disclosure, the connection casing comprises a support body delimiting a housing in which are housed at least partially the electrical connection means. Advantageously, the closing cap is pivotally mounted on the support body.

According to one characteristic of the disclosure, the introduction and guide means are formed on the support body.

According to one characteristic of the disclosure, the electrical connection means include an electrically conductive connection element on which the propagation means are intended to be connected.

According to one characteristic of the disclosure, the connection element includes at least one contact portion adapted to cooperate with the electrically conductive portion of the protection element when the protection element is in its first position.

According to one embodiment of the disclosure, the at least one contact portion protrudes outside the connection casing.

According to one characteristic of the disclosure, the connection point is arranged on the connection element.

Advantageously, the electrical connection means are intended for the connection of the at least one electrically conductive wire belonging to the propagation means.

According to one embodiment of the disclosure, the connection element comprises a connection part on which at least one electrically conductive wire belonging to the propagation means is intended to be connected.

According to one embodiment of the disclosure, the connection part includes at least one connection orifice for the passage of the metal core of the at least one electrically conductive wire.

According to one embodiment of the disclosure, the electrical connection means include at least one electrically conductive wire extending along the optically invisible network and being arranged to propagate, in terms of use of the detection terminal, an electromagnetic signal along the optically invisible network. The at least one electrically conductive wire forms thus an electrically conductive tracer wire. For example, the at least one electrically conductive wire may be disposed outside or inside the optically invisible network.

According to one characteristic of the disclosure, the protection element is electrically conductive and forms the electrically conductive portion.

According to one embodiment of the disclosure, the fastening element includes at least one passage opening leading into the housing receiving the connection casing, the passage opening being intended for the passage of at least one electrically conductive wire belonging to the propagation means.

According to one embodiment of the disclosure, the connection casing comprises immobilization means arranged to immobilize the electrical connection means.

According to one embodiment of the disclosure, the fastening element includes a receiving housing arranged to house at least partially the protection element when the protection element is in its first position.

According to one embodiment of the disclosure, the at least one contact portion extends in the receiving housing.

According to one embodiment of the disclosure, the receiving housing has a shape substantially complementary to that of the protection element.

According to one embodiment of the disclosure, the grounding means include a ground rod intended to be buried, and at least one ground wire electrically connected to the ground rod, the ground wire being arranged to be electrically connected to the electrically conductive portion when the protection element is in its first position.

According to one embodiment of the disclosure, the grounding means further include an electrically conductive connection member electrically connected to the ground wire and arranged to be electrically connected to the electrically conductive portion when the protection element is in its first position. The connection member is for example at least partially housed in the fastening element. According to one characteristic of the disclosure, the connection member include at least one contact portion adapted to cooperate with the electrically conductive portion of the protection element when the protection element is in its first position.

According to another embodiment of the disclosure, the grounding means further include a connection wire electrically connected to the ground wire and to the electrically conductive portion.

According to one embodiment of the disclosure, the protection element includes a protection body on which the electrically conductive portion is mounted.

According to one aspect of the disclosure, the protection body is made of an electrically insulating material, for example plastic or composite material.

According to one embodiment of the disclosure, the fastening element is made of an electrically insulating material, for example of plastic or composite material.

According to one embodiment of the disclosure, the fastening element is arranged to be fastened in a roadway, a pavement or even on a façade wall, near the network to be detected.

The present disclosure also concerns an installation comprising a detection terminal according to the disclosure, and propagation means connected to the electrical connection means belonging to the detection terminal, the propagation means being shaped to propagate when an electrical signal generator is connected to the electrical connection means, an electrical signal along the optically invisible network.

The present disclosure further concerns a method for detecting an optically invisible network, including the following steps:
  providing a detection terminal according to the disclosure,
  providing propagation means arranged to propagate an electrical signal along the optically invisible network,
  electrically connecting the propagation means to the electrical connection means belonging to the detection terminal,
  fastening the fastening element belonging to the detection terminal in or on a support,
  moving the protection element belonging to the detection terminal in its second position,
  injecting an electrical signal into the electrical connection means belonging to the detection terminal, and
  detecting the electromagnetic field generated by the propagation means.

BRIEF DESCRIPTION OF THE DRAWINGS

In any case, the disclosure will be better understood using the following description with reference to the appended schematic drawing showing, by way of a non-limiting example, several embodiments of this detection terminal.

FIGS. 11 and 12 are schematic views of a detection terminal according to a fourth embodiment of the disclosure in two different operating positions.

DETAILED DESCRIPTION OF THE DRAWINGS

Figure 1:
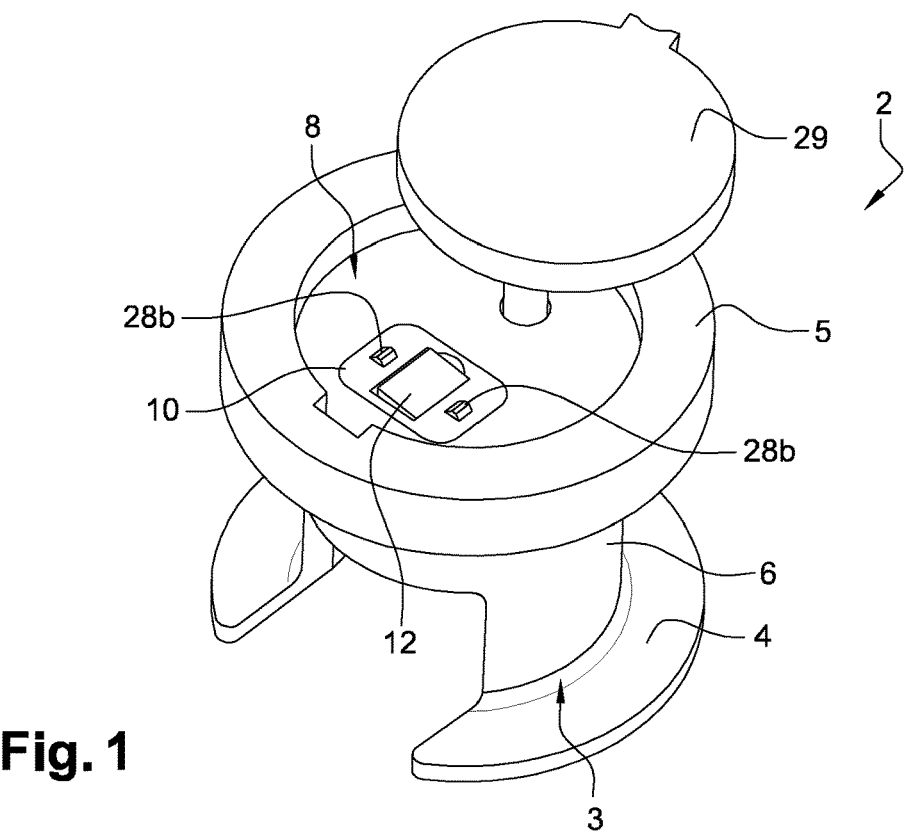
FIGS. 1 and 2 are perspective top views of a detection terminal according to a first embodiment of the disclosure in two different operating positions.
Figure 2:
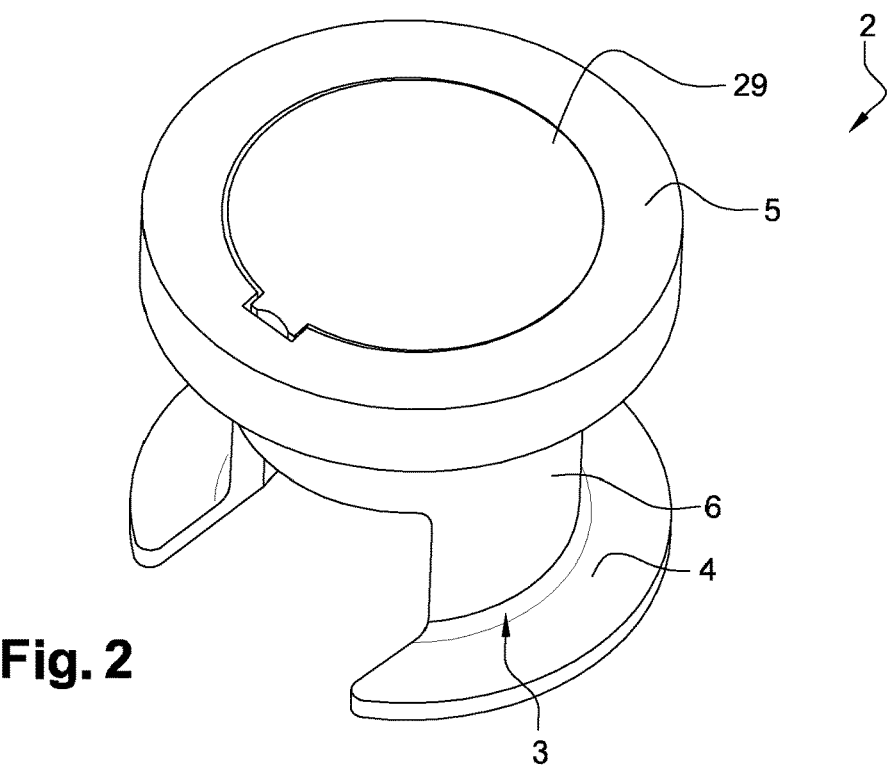
Figure 3:
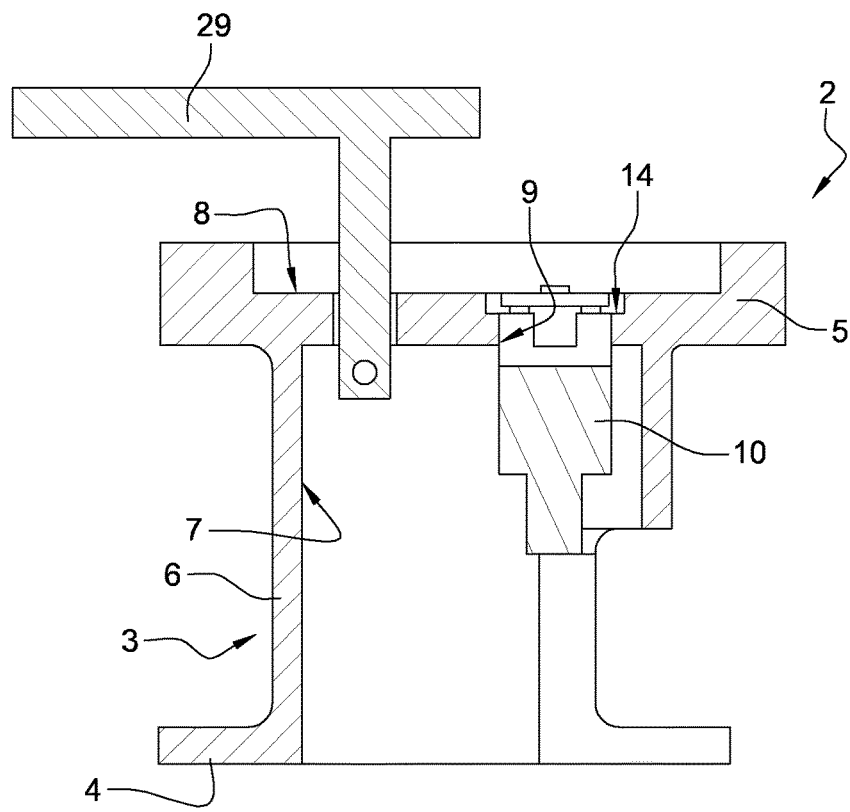
FIG. 3 is a sectional view of the detection terminal of FIG. 1.
Figure 4:
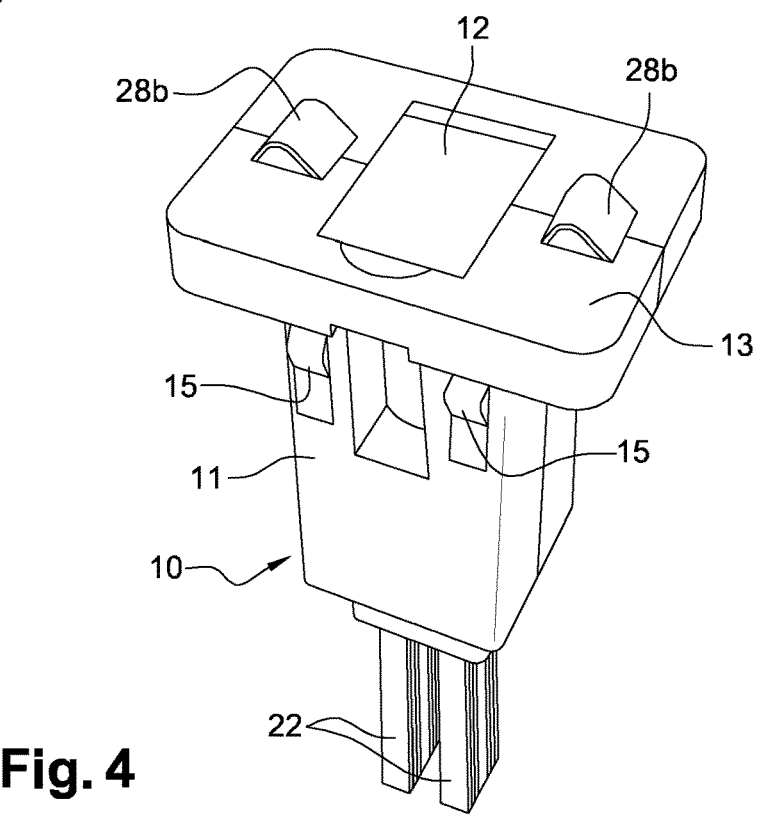
FIGS. 4 and 5 are perspective top views of a connection casing belonging to the detection terminal of FIG. 1.
Figure 5:
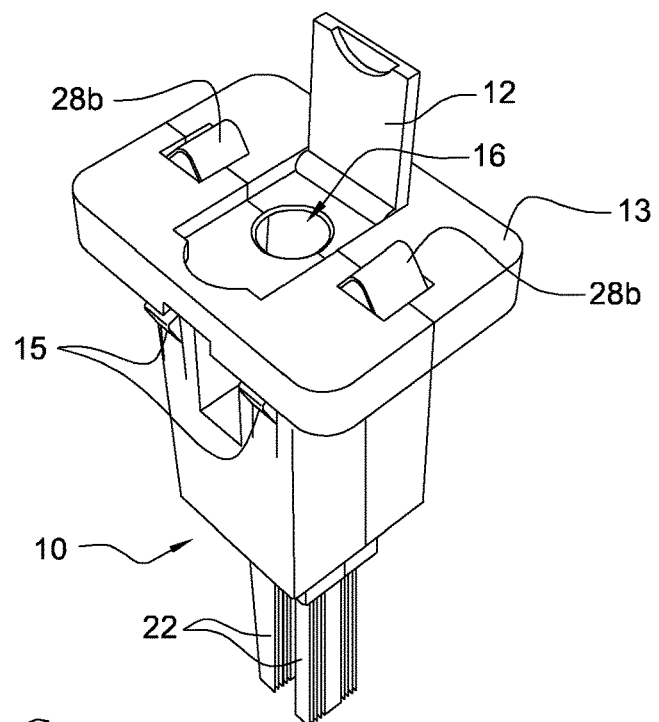

FIGS. 1 to 7 show a detection terminal 2 of an optically invisible network, such as a gas, electricity, optic fibers or water network.

The detection terminal 2 comprises a one-piece fastening element 3 intended to be fastened in or on a support, and more particularly in a roadway or a pavement. According to the embodiment shown in FIGS. 1 to 7, the fastening element 3 is electrically conductive and intended to be grounded. According to this embodiment, the fastening element 3 is preferably metallic, and may for example be made of cast iron.

According to the embodiment shown in FIGS. 1 to 7, the fastening element 3 includes a base 4, a support part 5 intended to be flush with or to protrude from the outer surface of the support, and a connecting part 6 connecting the base 4 to the support part 5 and delimiting an internal housing 7. According to the embodiment shown in FIGS. 1 to 7, the support part 5 has a circular shape. However, the support part 5 could have a different shape, for example square, rectangular or even hexagonal shape.

The support part 5 delimits a receiving housing 8 and a through-opening 9 leading on the one hand to the internal housing 7 and on the other hand to the receiving housing 8.

The detection terminal 2 further comprises a connection casing 10 mounted on the fastening element 3. According to the embodiment shown in FIGS. 1 to 7, the connection casing 10 extends through the through-opening 9 arranged on the support part 5, and is housed at least partially in the internal housing 7 delimited by the connecting part 6. The connection casing 10 is for example mounted on the fastening element 3 so as to be flush with the bottom of the receiving housing 8.

The connection casing 10 is made of an electrically insulating material, and for example made of plastic material. As shown more particularly in FIG. 6, the connection casing 10 includes a support body 11 and a closing cap 12 pivotally mounted on the support body 11.

The body support 11 comprises a retaining portion 13 intended to bear against a shoulder 14 arranged on the support part 5 and surrounding the through-opening 9, and fastening tabs 15 arranged to cooperate with the support part 5 so as to immobilize the support body 11 on the fastening element 3.

The support body 11 further includes an introduction orifice 16 opening into the receiving housing 8 and shaped so as to allow the introduction of a plug 17 of an electrical signal generator into the connection casing 10, and a tubular guiding portion 18 into which the introduction orifice 16 opens, the guiding portion 18 being arranged to guide the plug 17 of an electrical signal generator when introducing said plug into the connection casing 10.

The closing cap 12 is more particularly pivotally mounted on the support body 11 between a closed position (see FIG. 4) wherein the closing cap 12 seals the introduction orifice 16 and prevents access to the latter, and a released position (see FIG. 5) wherein the closing cap 12 releases access to the introduction orifice 16 and permits the introduction of the plug 17 of an electrical signal generator into the connection casing 10. The closing cap 12 is advantageously arranged to flush with the upper surface of the retaining portion 13 and the bottom of the receiving housing 8 when it is in its closed position.

Figure 6:
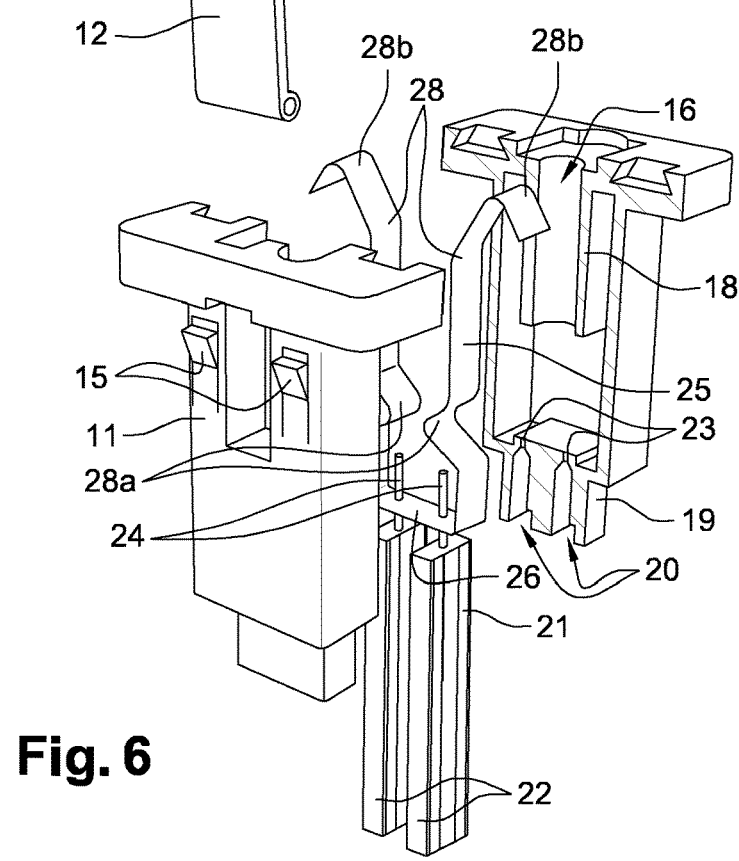
FIG. 6 is an exploded perspective view of the connection casing of FIG. 4.

As shown in FIG. 6, the support body 11 also includes a mounting portion 19 delimiting two housings 20 each intended to receive one end portion of the sheath 21 of an electrically conductive wire 22, and including two passage orifices 23 each opening into one of the housings 20 and each adapted to the passage of the core 24 of the corresponding electrically conductive wire 22. Each housing 20 has advantageously a shape complementary to the sheath 21 of the corresponding electrically conductive wire 22. For example, the sheath 21 of each electrically conductive wire 22 and each housing 20 may have a rectangular section. Advantageously, each passage orifice 23 includes a flared introduction portion so as to facilitate the introduction therein of the core 24 of the corresponding electrically conductive wire 22.

Figure 7:
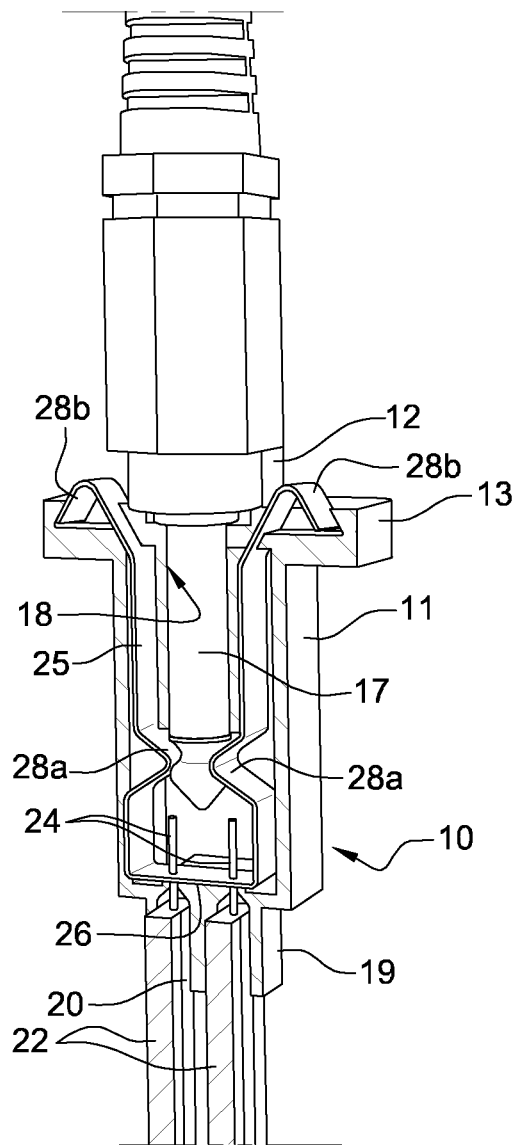
FIG. 7 is a sectional perspective view of the connection casing of FIG. 4 on which the plug of an electrical signal generator is engaged.

As shown more particularly in FIGS. 6 and 7, the detection terminal 2 further includes an electrically conductive connection element 25 partially housed in the connection casing 10. According to the embodiment shown in FIGS. 1 to 7, the connection element 25 has a general U-shape, and is shaped for connecting the two electrically conductive wires 22. The connection element 25 is advantageously in one-piece, and is for example made of stamping and/or bending. The connection element 25 is preferably made in the same material as the core 24 of each electrically conductive wire 22, and for example of stainless steel.

The connection element 25 includes a connection part 26 disposed in the support body 11 and bearing against a support surface provided on the latter, the connection part 26 being provided with two connection orifices each located opposite to a passage orifice 23 and each intended for the passage of the core 24 of the corresponding electrically conductive wire 22. The connection element 25 also includes two connection branches 28 each having a connection portion 28a located in the extension of the guiding portion 18 and intended to come in electrical contact with the plug 17 of an electrical signal generator when said plug is introduced into the guiding portion 18, and a contact portion 28b protruding from the connection casing 10 and extending into the receiving housing 8.

The detection terminal 2 finally includes a protection element 29 being particularly in the shape of a protection cover.

According to the embodiment shown in FIGS. 1 to 7, the protection element 29 is electrically conductive, and is electrically connected to the fastening element 3. The protection element 29 is thus intended to be grounded via the fastening element 3. The protection element 29 is movably mounted on the fastening element 3 between a first position (see FIG. 2) wherein the protection element 29 is housed in the receiving housing 8 and is in electrical contact with the second contact portions 28b belonging to the connection element 25, and a second position (see FIG. 1) wherein the protection element 29 is disposed outside the receiving housing 8 and is thus electrically insulated from the connection element 25. The protection element 29 is advantageously arranged so as to cover the connection casing 10 and to prevent access to the latter when it is in its first position.

The protection element 29 is further able to maintain an electrical continuity between the fastening element 3 and the connection element 25, and thus between the fastening element 3 and the electrically conductive wires 22 connected to the connection element 25, when it is in its first position. These dispositions allow grounding the electrically conductive wires 22 connected to the connection element 25 when the protection element 29 is in its first position, and insulating from the ground these electrically conductive wires 22 when the protection element 29 is in its second position.

The protection element 29 has an outer surface opposite to the support part 5. The outer surface may advantageously include means for identifying the network to be detected. These identification means can for example include inscriptions engraved or printed directly on the outer surface of the protection element 29, or added thereon, for example by bonding or fastening an identification element provided with these inscriptions.

A method for detecting an optically invisible network, such as a gas, electricity, optic fibers or water network, using a detection terminal 2 according to the disclosure will now be described.

This method includes the following steps:
- providing a detection terminal 2 according to the disclosure,
- providing at least one electrically conductive wire 22 extending along the optically invisible network,
- stripping one of the electrically conductive wire 22 ends,
- connecting the stripped end of the electrically conductive wire 22 on the connection element 25 of the detection terminal 2,
- fastening the fastening element 3 of the detection terminal 2 in or on a support, such as a pavement, near the network to be detected,
- moving the protection element 29 in its second position,
- moving the closing cap 12 in its released position,
- introducing the plug 17 of an electrical signal generator, such as a current generator, in the introduction orifice 16 until the plug comes into contact with the connection portions 28a,
- injecting an electrical signal into the electrical connection means belonging to the detection terminal, and
- injecting an electrical signal into the connection element 25 using the current generator, and
- detecting the electromagnetic field generated by the electrically conductive wire 22 using an electromagnetic detector so as to detect and track the optically invisible network.

The fastening step includes, for example, fastening to the fastening element 3 of the detection terminal 2 near a gas meter box when the network to be detected is a gas network, and near an electric meter box, an electrical cabinet or an electric transformer when the network to be detected is an electrical network.

If other optically invisible networks equipped with detection terminals 2 according to the disclosure are located near the optically invisible network to be detected, the detection method may comprise an additional step including moving the protection members 29 of the detection terminals 2 belonging to these other optically invisible networks in their second position, and this so as to insulate from the ground the electrically conductive wires connected to the fastening elements 3 belonging to these detection terminals 2 in order to avoid the propagation of a residual electrical signal along these electrically conductive wires likely to disturb the detection and the tracking of the optically invisible network.

Figure 8:
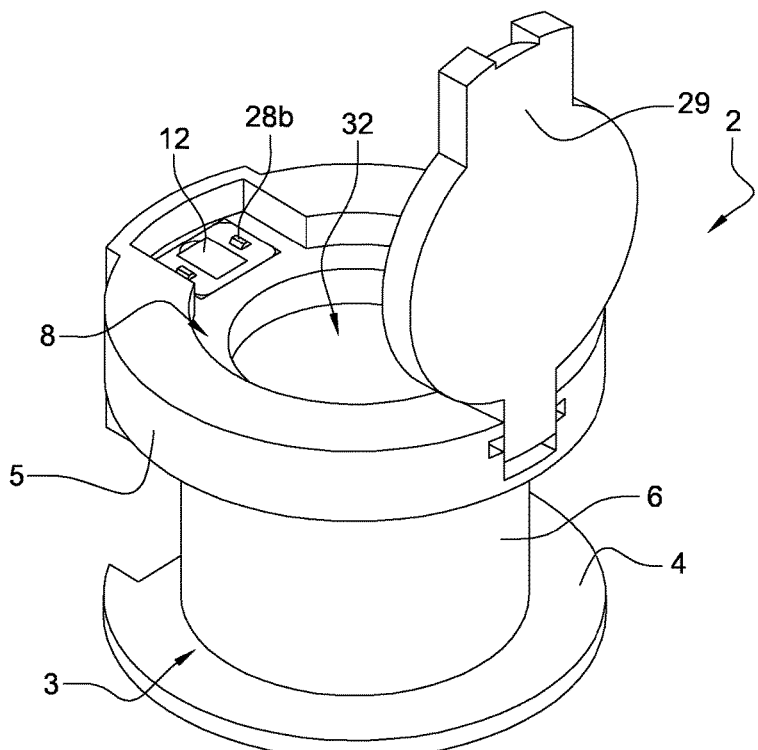
FIG. 8 is a perspective top view of a detection terminal according to a second embodiment of the disclosure.

FIG. 8 shows a detection terminal 2 according to a second embodiment of the disclosure which differs from that shown in FIGS. 1 to 7, mainly in that the connection casing 10 is housed outside the connecting portion 6, and in that the detection terminal 2 forms a valve box intended to be located at the ground so as to allow access, using an appropriate key, to the operating member of a buried pipeline valve, such as a water distribution pipeline. Thus, the support part 5 further includes a passage opening 32 leading into the connecting part 6, and the connecting part 6 is shaped to allow the passage of an actuating key of the operating member of the corresponding valve. According to this embodiment of the disclosure, the protection element 29 is pivotally mounted on the fastening element 3 around a swivel axis transverse, and preferably substantially perpendicular, to the longitudinal axis of the detection terminal 2.

Figures 9, 10:
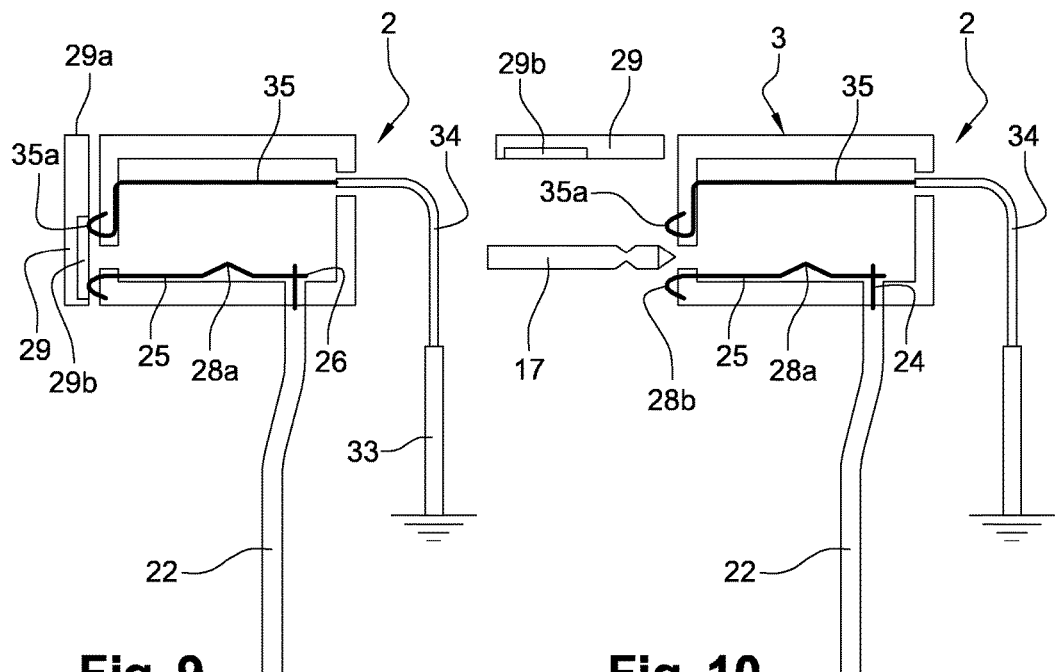
FIGS. 9 and 10 are schematic views of a detection terminal according to a third embodiment of the disclosure in two different operating positions.

FIGS. 9 and 10 show a detection terminal 2 according to a third embodiment of the disclosure which differs from that shown in FIGS. 1 to 7 mainly in that the fastening element 3 is made of an electrically insulating material, for example of plastic or composite material, in that the protection element 29 includes a protection body 29a made of an electrically insulating material, for example of plastic or composite material, and an electrically conductive portion 29b mounted on the protection body 29a, and in that the detection terminal 2 further includes grounding means.

The grounding means include advantageously a ground rod 33 intended to be buried, a ground wire 34, such as a braided ground wire, electrically connected to the ground rod 33, and an electrically conductive connection member 35 and housed at least partially in the fastening element 3, the connection member 35 being electrically connected to the ground wire 34 and being arranged to be electrically connected to the electrically conductive portion 29b when the protection element 29 is in its first position (see FIG. 9). The connection member 35 includes more particularly a contact portion 35a able to cooperate with the electrically conductive portion 29b of the protection element 29 when the latter is in its first position.

FIGS. 11 and 12 show a detection terminal 2 according to a fourth embodiment of the disclosure which differs from that shown in FIGS. 9 and 10 mainly in that the grounding means include, instead of the connection member 35, a connection wire 36 electrically connected to the ground wire 34 and to the electrically conductive portion 29b.

It goes without saying that the disclosure is not limited to the sole embodiments of this detection terminal, described above as example, it encompasses on the contrary all the variants.

The invention claimed is:

1. A detecting terminal for detecting an optically invisible network, the detecting terminal including:
   a fastening element intended to be fastened in or on a support, the fastening element being electrically conductive,
   electrical connection means for the connection of propagation means arranged to propagate an electrical signal along the optically invisible network, the electrical connection means including a connection point for the electrical connection of an electrical signal source,
   grounding means intended to be grounded, the fastening element forming at least partially the grounding means,
   a connection casing having at least partially the electrical connection means disposed therein, said connection casing including an introduction orifice for introducing a plug of an electrical signal generator in the connection casing, and a guiding portion into which the introduction orifice opens, the guiding portion being configured to guide the plug of the electrical signal generator when introducing said plug into the connection casing, the introduction orifice and the guiding portion being shaped such that, when the plug is engaged in the introduction orifice and the guiding portion, the plug is able to come into electrical contact with the connection point, said connection casing further including a closing cap movable between a closed position wherein the closing cap at least partially closes the introduction orifice and prevents access to the introduction orifice, and a released position wherein the closing cap releases access to the introduction orifice,
   a protection element comprising at least one electrically conductive portion, the protection element being movably mounted on the fastening element between a first position wherein the protection element covers at least partially the electrical connection means and the electrical connection means is in electrical contact with the electrically conductive portion and is electrically connected to the grounding means through the electrically conductive portion, and a second position wherein the electrical connection means is electrically insulated from the electrically conductive portion and from the grounding means, wherein the electrically conductive portion of the protection element is connected to the fastening element so as to maintain an electrical continuity between the fastening element and the electrical connection means when the protection element is in the first position.

2. The detection terminal according to claim 1, wherein the protection element is captively mounted on the fastening element.

3. The detection terminal according to claim 1, wherein said connection casing is mounted on the fastening element.

4. The detection terminal according to claim 1, wherein the protection element is shaped so as to cover, in the first position, at least partially the connection casing.

5. The detection terminal according to claim 1, wherein the electrical connection means include an electrically conductive connection element on which the propagation means is intended to be connected.

6. The detection terminal according to claim 5, wherein the connection element includes at least one contact portion adapted to cooperate with the electrically conductive portion of the protection element when the protection element is in the first position.

7. The detection terminal according to claim 1, wherein the fastening element includes a receiving housing arranged to house at least partially the protection element when the protection element is in the first position.

8. The detection terminal according to claim 1, wherein the protection element is electrically conductive and forms the electrically conductive portion.

9. An installation comprising a detection terminal according to claim 1, and propagation means connected to the electrical connection means belonging to the detection terminal, the propagation means being shaped to propagate, when an electrical signal generator is connected to the electrical connection means, an electrical signal along the optically invisible network.

10. A method for detecting an optically invisible network, the method including the following steps:
  providing a detection terminal according to claim 1,
  providing propagation means arranged to propagate an electrical signal along the optically invisible network,
  electrically connecting the propagation means to the electrical connection means belonging to the detection terminal,
  fastening the fastening element belonging to the detection terminal in or on a support,
  moving the protection element belonging to the detection terminal in the second position,
  injecting an electrical signal into the electrical connection means belonging to the detection terminal, and
  detecting the electromagnetic field generated by the propagation means.

11. The detection terminal according to claim 1, wherein the electrically conductive portion is permanently electrically connected to the grounding means.

12. The detection terminal according to claim 1, wherein the electrically conductive portion is electrically connected to the grounding means when the protection element is in the first position, and is insulated from the grounding means when the protection element is in the second position.

13. A detecting terminal for detecting an optically invisible network, the detecting terminal including:
  a fastening element intended to be fastened in or on a support and including an internal housing,
  a connection casing at least partially housed in the internal housing of the fastening element, said connection casing including an introduction orifice for introducing a plug of an electrical signal generator in the connection casing, and a guiding portion into which the introduction orifice opens, the guiding portion being configured to guide the plug of the electrical signal generator when introducing said plug into the connection casing, said connection casing further including a closing cap movable between a closed position wherein the closing cap at least partially closes the introduction orifice and prevents access to the introduction orifice, and a released position wherein the closing cap releases access to the introduction orifice,
  electrical connection means for the connection of propagation means arranged to propagate an electrical signal along the optically invisible network, the electrical connection means including a connection point for the electrical connection of an electrical signal source and being at least partially disposed in the connection casing, the introduction orifice and the guiding portion being shaped such that, when the plug of the electrical signal generator is engaged in the introduction orifice and the guiding portion, the plug is able to come into electrical contact with the connection point,
  grounding means intended to be grounded,
  a protection element comprising at least one electrically conductive portion, the protection element being movable relative to the fastening element between a first position wherein the protection element covers at least partially the electrical connection means and the electrical connection means is in electrical contact with the electrically conductive portion and is electrically connected to the grounding means through the electrically conductive portion, and a second position wherein the electrical connection means is electrically insulated from the electrically conductive portion and from the grounding means,
  wherein the protection element is configured so as to cover at least partially the connection casing and to prevent access to the connection casing when the protection element is in the first position.

14. The detection terminal according to claim 13, wherein the protection element is configured so as to cover at least partially the closing cap when the protection element is in the first position.

* * * * *